Nov. 3, 1959 W. H. LOCKWOOD Re. 24,731

TIERABLE NESTING RECEPTACLE

Original Filed Sept. 16, 1952 4 Sheets-Sheet 1

INVENTOR.
WARREN H. LOCKWOOD
BY Albert R. Gobrick
ATTORNEY

TIERABLE NESTING RECEPTACLE

Original Filed Sept. 16, 1952 4 Sheets-Sheet 2

INVENTOR.
WARREN H. LOCKWOOD
BY Albert R. Golrick
ATTORNEY

Nov. 3, 1959 W. H. LOCKWOOD Re. 24,731

TIERABLE NESTING RECEPTACLE

Original Filed Sept. 16, 1952 4 Sheets-Sheet 3

INVENTOR.
WARREN H. LOCKWOOD
BY Albert R. Gelrick
ATTORNEY

Nov. 3, 1959 W. H. LOCKWOOD Re. 24,731.

TIERABLE NESTING RECEPTACLE

Original Filed Sept. 16, 1952 4 Sheets-Sheet 4

INVENTOR.
WARREN H. LOCKWOOD
BY Albert R. Goldrick
ATTORNEY

United States Patent Office

Re. 24,731
Reissued Nov. 3, 1959

24,731

TIERABLE NESTING RECEPTACLE

Warren H. Lockwood, Downey, Calif.

Original No. 2,782,936, dated February 26, 1957, Serial No. 309,885, September 16, 1952. Application for reissue January 12, 1959, Serial No. 786,441

7 Claims. (Cl. 211—126)

Matter enclosed in heavy brackets [ ] appears in the original patent but forms no part of this reissue specification; matter printed in italics indicates the additions made by reissue.

The present invention relates to improvements in receptacles and more particularly to receptacles adapted to be tiered when in use and to be nested when empty.

A variety of structures has been suggested for crates, boxes, trays and similar receptacles, which may be stacked one upon another when in use and nested when empty for conservation of space. One commonly used form of such receptacles employs a hinged member or plurality thereof at the top rim of a tapered sided receptacle which may be swung into place across the top of the receptacle to support thereon another like receptacle and be swung outwardly from the supporting position to allow nesting of one receptacle within another. Other structures utilize separate or removable slats laid across the top of one receptacle to provide tiering support for another or sliding or pivoted slats at the bottom of the tapered side receptacle which are movable to a projecting position to provide support by engaging the top rim of an underlying receptacle but retractable to a non-projecting position to allow nesting. Such receptacles have labored under the disadvantages attendant upon separate tiering support means and movable members which are subject to breakage or deformation, as well as requiring in many instances, more storage space for a plurality of tiers thereof than is desirable, and also manipulation of the support means to prepare for tiering or nesting operations.

The present invention obviates the need for such movable members and provides an extremely simple structure which is rugged, low in manufacturing cost yet tierable and nestable to furnish the space-saving characteristics desired in circulating or returnable receptacles used in the storage, transportation and distribution of goods.

An object then of the present invention is the provision of a tierable and nestable receptacle having no moving parts.

Another object is the provision of a receptacle structure reducing lost space among a plurality of tiers of such receptacles.

Other objects and advantages of the invention will appear from the following description and drawings wherein—

Figure 1:
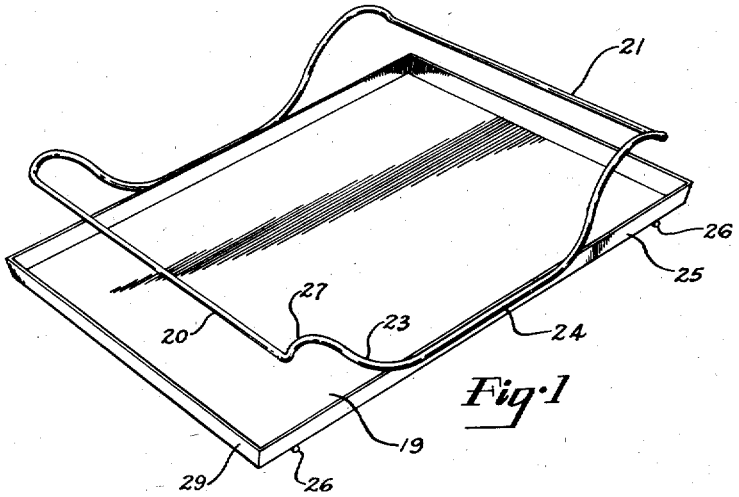
Fig. 1 shows a tray-like form of the invention.

The open tray form of the invention shown in Fig. 1 comprises a tray member or bottom structure 19; a transverse pair of parallel cross rails or tiering support members 20, 21 having a length equal to the tray width mounted in upwardly or vertically spaced relation to the tray at each end by curved members or struts 23 extending in general disposition downwardly and inwardly to the bottom structure and affixed along the bottom reach portions 24 thereof to the long side panels 25 of the tray member; and a pair of bars 26, parallel to but more closely spaced than the rail members 20, 21 affixed to the under surface of the tray bottom. For closer nesting the side panels 25 and end panels 29 are slanted, and the rail support members 23 are attached along the upper edge of the outer faces of panels 25 by riveting, welding or other means dependent upon materials used. The rail members 20, 21 and their support reaches 23 may be formed from a single rod which may be welded to the tray member when the latter is formed of sheet metal. Preferably the members 23 attached to each side of the tray are co-planar to minimize lost space between adjacent tiers or nests of the receptacles. Further, it is to be noted that the members 23 slant inwardly from the rails 20—21 to their locus of attachment to the tray member and that the upper end portions 27 of the curved supporting members are curved convexly upwardly above the plane of the rails.

Figure 2:
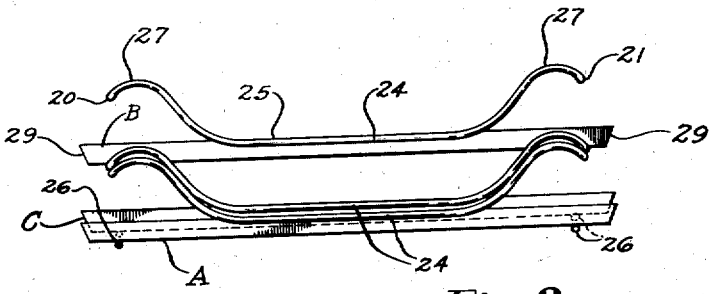
Fig. 2 is a side view of a plurality of the receptacles of Fig. 1 shown in both tiered and nested relation.

When the trays are tiered, as may be seen from Fig. 2, an upper tray B rests upon the transverse rails of a lower tray C, being held in position from lateral displacement by the upwardly convex portions 27 of the side members serving as side stops and from longitudinal displacement by the members 26 of upper tray B which lie between the cross rails and abut against the members 23 of lower tray C and serving as end stops or locating means.

To put the trays in nested relation, as illustrated by members A and C in Fig. 2, with the bottom of the members 23 of C resting upon the top of the corresponding members of the lower tray, the following procedure is used: An upper tray is tilted endwise and the lowermost projecting end portion of its bottom structure is then slid under one of the cross rails 20—21 (through the opening or clearway there) until the other end is positioned to clear the other cross rail. The tray may then be dropped down into nesting position, being directed to a centered position by the convergent supporting members 23 at each side. Successive trays may thus be nested until the clearance between the cross rail of the lowermost tray of the tier and the last positioned tray is such that an additional tray cannot be manipulated into position under either rail 20 or 21 by the foregoing procedure. For removal of the receptacles from nested position, the reverse of this procedure is followed by displacing the uppermost tray endwise until one end may be brought up vertically inside the overlying cross rail of the lowermost tray and then the tray may be slid endwise out of position to disengage the other end from beneath the other cross bar of the lowermost tray.

Figure 3:
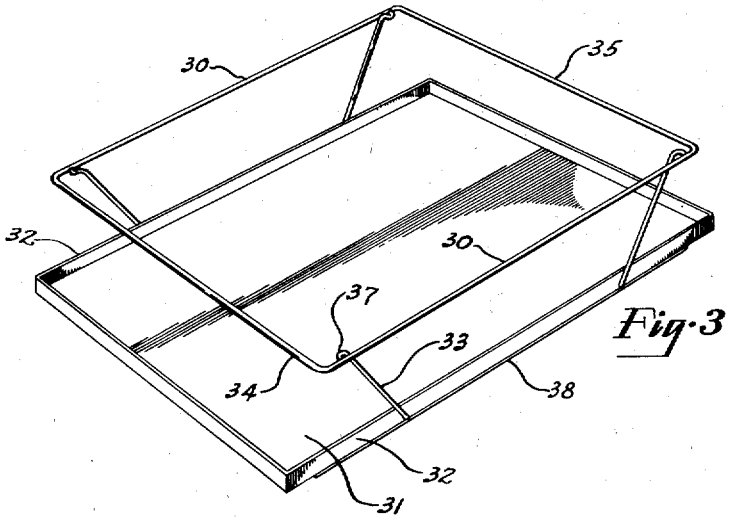
Fig. 3 shows a second form of tray generally similar to that of Fig. 1 but having certain reinforcement means provided therein.
Figure 4:
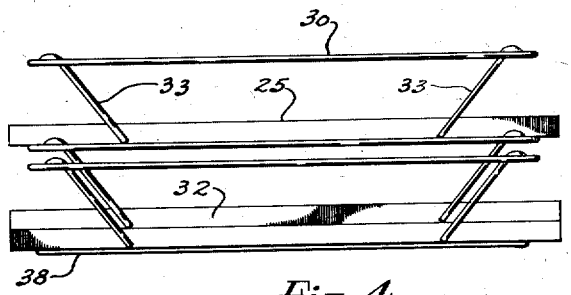
Fig. 4 is a side view of a plurality of receptacles such as that of Fig. 3 showing both tiered and nested relation.
Figure 5:
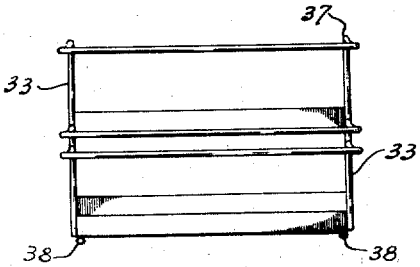
Fig. 5 is an end view of the receptacles of Fig. 4.

The form of the invention shown in Fig. 3 is generally similar to that of Figs. 1 and 2 being an open or tray type receptacle. The tray member 31 is shown with straight edges, to the lateral pair 32 of which are secured the bottom ends of the slanting struts or support members 33, to the upper ends of which are welded or secured the transverse rails or support members 34, 35 and the longitudinal ties or struts 30. In this case, a single rod, bent into rectangular form and welded to the outer side of the members 32, may provide both struts 30 and transverse members 34, 35. Here again upwardly projecting ends 37, similar to the portion 27 of Fig. 1, are provided as side stops or locating means for lateral retention of the trays in tiered relation. One or more longitudinal bars 38 shorter in length than the spacing of rails 34, 35 may be provided as locating means on the bottom tray surfaces whereby longitudinal displacement of the tiered trays may be prevented, the ends of bars 38 serving as end stops. Manipulation in tiering and nesting is similar to that already described for the first form.

Figure 6:
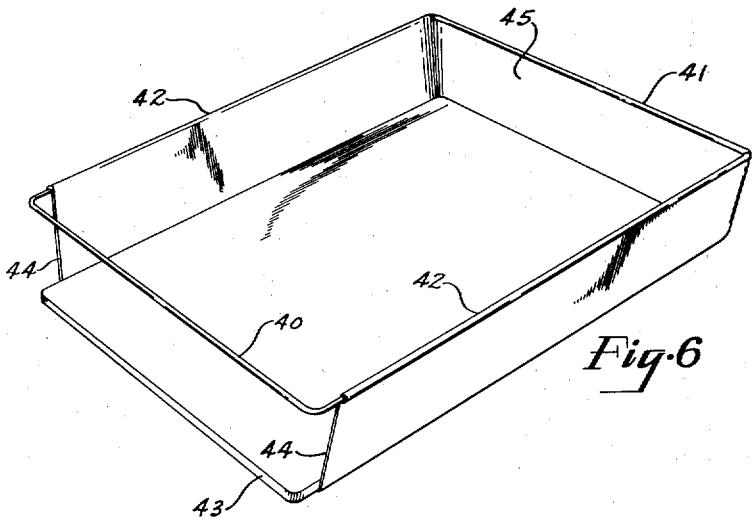
Fig. 6 shows a box-like form of the invention having three sides enclosed.
Figure 7:
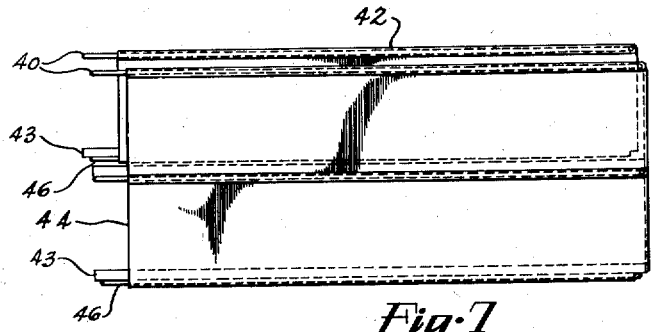
Fig. 7 is a side view of a plurality of the receptacles of Fig. 6 in both tiered and nested relation.
Figure 8:
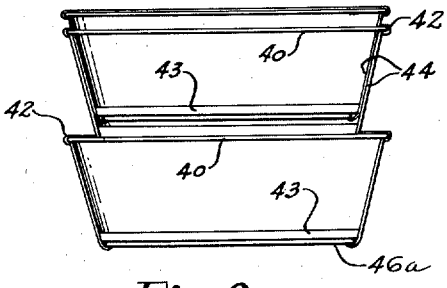
Fig. 8 is an end view of Fig. 7.

In Figs. 6 to 8 inclusive I show a receptacle structure wherein the sides and one end are enclosed by solid panels from the bottom to the height of the tiering support cross rails. As in the structure of Fig. 3 the top comprises a rectangular wire frame having transverse end rail reaches or support members 40—41 and longitudinal reaches 42 which are of less length than the length of the bottom planiform structure 43. The top rail reaches are connected to the bottom by sloping side panels 44 and vertical end panel 45. These side panels are preferably formed of sheet metal beaded over the top rails and integral with or secured in any convenient manner to the bottom structure 43. The end structure opposite to vertical end panel 45 is open as shown to provide a clearway from the projecting bottom portion 43, at that end, upwardly toward support member 40. Bottom strips 46 extend longitudinally and the ends thereof terminate short of the bottom structure ends to provide end stops or longitudinal locating means in tiering. Corresponding ends of strips 46 may be joined by transverse elements 46a into a rectangular U-shaped bottom frame. End wall 45 may be omitted. Means may be provided on the cross rail and the bottom structure to prevent lateral movement of tiered receptacles.

In tiering the structures shown in Fig. 6 one receptacle is placed above the other one, with the bottom structure resting upon cross rail 40 and bead 41 of the under receptacle and with the end of bottom strips 46 in abutting relation to the inside of rail 40 and with the opposite ends of strips 46 in abutting relation to the bead structure of the vertical end panel 45. Thus the top bead structures of the tiered receptacles are in substantially vertical planes. When nesting, the bottom structure of the open end of one receptacle is slid beneath the cross rail 40 of the underlying receptacle and nesting can take place as shown in the upper portion of Figs. 7 and 8.

Figure 9:
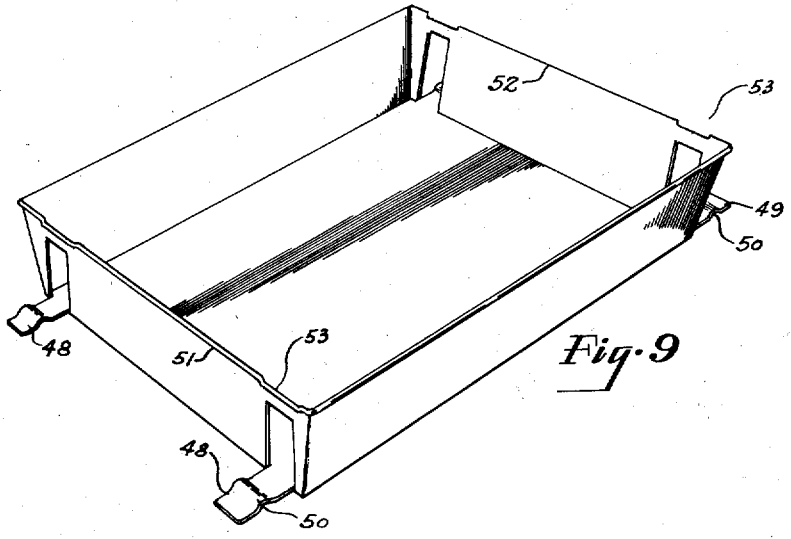
Fig. 9 shows a box-like form of the invention enclosed on all four sides.
Figure 10:
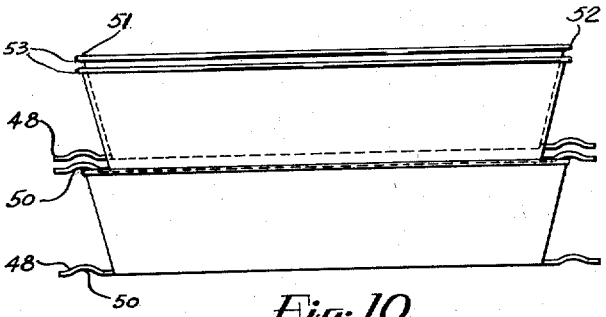
Fig. 10 is a side view of a plurality of the receptacles such as that in Fig. 9 shown in both tiered and nested relation.
Figure 11:
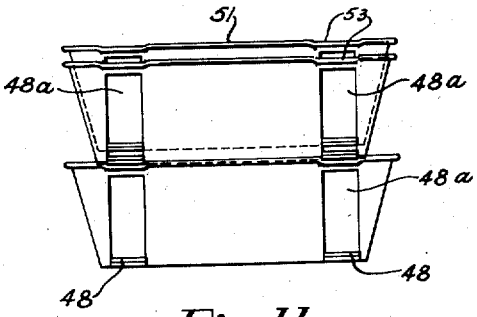
Fig. 11 is an end view corresponding to Fig. 10.

In Figs. 9 to 11 inclusive I show still another embodiment of the invention wherein the metal receptacles are provided with sloping or tapering side walls and end walls to afford nesting in the well-known manner. However to obtain tiering I strike out from the end walls pairs of load bearing lugs 48 and 49 projecting outwardly from the bottom structure. These lugs or rests are formed to have transversely extending grooves 50 located substantially in vertical alignment with the transverse cross rails or support members 51 and 52 of the end wall structure, and serving as locating means in tiering against endwise displacement. The tiering as shown in Figs. 10 and 11 is obvious. In nesting this construction the lugs 48 of the upper receptacle are inserted in the struckout openings or clearways 48a in the end wall of the underlying receptacle in a swinging motion within the end and the lugs 49 at the opposite end swing down at the inside of the opposite openings. It will be noted that the overall length of the lugs 48—49 is shortened relative to the height of the struck out openings; i.e., the ends of the lugs after being struck out from the end panels are sheared off. It is understood the lugs and openings can be separately formed and the lugs attached in the manner related to the openings as shown. Above each projecting struck out portion 48—49 the beads 51, 52 may be depressed or indented slightly as at 53 to receive the portions 48—49 to prevent lateral displacement.

In each of the foregoing disclosed receptacle structures it will be noted that I rely upon transversely extending cross rails longitudinally spaced inwardly from at least one end of the bottom structure and with each receptacle structure being provided with particular means for engaging such rails to afford the tiering of the receptacles when bearing merchandise. Also, in all forms at least one end is apertured between the corresponding cross rail and the load supporting surface or bottom to receive an end portion or projection on the bottom of a similar receptacle to be nested therein, thereby permitting longitudinal displacement of the latter to provide clearance at the opposite end that is required for manipulation into nesting relationship. Correlative with this structural characteristic is the further feature that at the said apertured end the supporting means for the transverse rail is secured to the bottom member at a locus displaced inwardly from the vertical plane passed through the rail to permit the mutual displacement of the bottom surface of one receptacle relative to the transverse rails of another as required in nesting.

I claim:

1. A receptacle adapted for tiering and nesting with receptacles of like construction comprising a planiform bottom structure providing a load supporting and carrying surface, support members disposed above the bottom inwardly of vertical planes through the end edges of the bottom and spaced apart one near each end of the receptacle to provide a pair of parallel tiering support members adapted to support the bottom structure of a second like receptacle tiered thereon, means rigidly attached near two opposed side edges of said bottom structure and rigidly attached to opposite ends of said support members and holding each of said support members always in the same fixed relation, said bottom structure including on at least one end a portion beneath the corresponding support member and projecting beyond the vertical plane through the corresponding support member to provide bearing surface for tiering bearing on a support member of an underlying like receptacle, said means extending upwardly from a side edge of said bottom structure and being located outwardly of the vertical plane through said edge and so constructed and arranged that said means nests with similar means on an underlying like receptacle, there being a clearway extending upwardly from said projecting portion toward and directly beneath said corresponding support member, said clearway being provided for the insertion of the projecting portion of a like receptacle nested therein, the locus of attachment to the bottom structure of the means holding said corresponding support member being inward of said vertical plane through said corresponding support member, and means on the bottom structure adapted for cooperative engagement with the support members of an underlying like receptacle structure for maintaining a plurality of the receptacles in vertical tiered alignment with the perimeter of an upper receptacle vertically directly aligned above the perimeter of a lower receptacle.

2. A receptacle as in claim 1 wherein said first named means comprises struts extending from an associated support member downwardly and inwardly lengthwise of said receptacle to said bottom structure.

3. A receptacle as in claim 1 including a said projecting bottom portion beneath the support member at each end and there being a corresponding clearway extending upwardly from each said projecting portion, whereby a receptacle is provided symmetrical at opposite ends.

4. A receptacle as in claim 1 wherein said first named means comprises sheet material.

5. A receptacle as in claim 1 having an end wall across at least one end of said receptacle and extending from said support member there and downwardly to said bottom structure, said bottom structure projecting portion at said one end comprising tongue means of less width than said bottom structure at said one end, and there being said clearway above said tongue means not substantially wider than said tongue means.

*6. A receptacle adapted for tiering and nesting with receptacles of like construction comprising a planiform bottom structure providing a load supporting and carrying surface, support members disposed above the bottom inwardly of vertical planes through the correlative outermost perimeter of the bottom and spaced apart at least one near each end of the receptacle to provide a pair of tiering support members adapted to support the bottom structure of a second like receptacle tiered thereon, means rigidly attached at a plurality of the edges of said bottom structure and rigidly attached to said support members and holding each of said support members always in the same fixed relation, said bottom structure including on at least one end a portion beneath the corresponding support member and projecting through the vertical plane through the corresponding support member to provide bearing surface for tiering bearing on a support member of an underlying like receptacle, said means extending upwardly from the edge of said bottom structure to which it is attached and so constructed and arranged that said means nests with similar means on an underlying like receptacle, there being a clearway extending upwardly from said projecting portion toward and directly beneath said corresponding support member, said clearway being provided for the insertion of the projecting portion of a like receptacle nested therein, the locus of attachment to the bottom structure of the means holding said corresponding support member being inward of said vertical plane through said corresponding support member, and means on the bottom structure adapted for cooperative engagement with an underlying like receptacle structure for maintaining a plurality of the receptacles in vertical tiered alignment with the perimeter of an upper receptacle vertically directly aligned above the perimeter of a lower receptacle.*

*7. A receptacle adapted for tiering and nesting with receptacles of like construction comprising a bottom load supporting part and upper edge parts, and side parts rigidly connected with said bottom part and with said upper edge parts, said bottom load supporting part and upper edge*

*parts and side parts including upper tiering support members rigidly connected with said upper edge and side parts, said bottom load supporting part and upper edge parts and side parts including lower tiering support members rigidly connected with said side parts and said bottom part, said upper support members being each vertically directly above a corresponding lower support member, whereby the lower support members of one receptacle are adapted to engage and rest upon the corresponding upper support members of a second like receptacle in like orientation of the two receptacles for tiering arrangement with the perimeter of said first receptacle vertically aligned directly above the perimeter of said second receptacle, there being a clearway provided between said bottom load supporting part and upper edge parts and side parts downwardly from each of said upper support members of said upper receptacle may pass lower support member of an upper like receptacle in like orientation only by manipulation after which said lower support members of said upper receptacle may pass downwardly in said clearways to a nested position in said lower receptacle, and said parts being so constructed and arranged that the parts of an upper receptacle nest with like parts of a lower receptacle in like orientation with like parts of said upper receptacle vertically aligned directly above like parts of said lower receptacle.*

References Cited in the file of this patent or the original patent

UNITED STATES PATENTS

| | | |
|---|---|---|
| 244,809 | Kern | July 26, 1881 |
| 1,708,474 | Hoffman | Apr. 9, 1929 |
| 2,127,999 | Johnson | Aug. 23, 1938 |
| 2,497,574 | Bahnson | Feb. 14, 1950 |
| 2,609,120 | Williams | Sept. 2, 1952 |
| 2,620,083 | Moorhead | Dec. 2, 1952 |
| 2,641,383 | Coursey | June 9, 1953 |
| 2,684,766 | Blom | July 27, 1954 |